Dec. 23, 1952  L. D. STRATTON  2,622,660

MOTOR VEHICLE SEAT HEADREST

Filed April 4, 1950

INVENTOR.
Leon D. Stratton
BY Victor J. Evans & Co.
ATTORNEYS

Patented Dec. 23, 1952

2,622,660

UNITED STATES PATENT OFFICE 2,622,660

MOTOR VEHICLE SEAT HEADREST

Leon D. Stratton, Columbiaville, Mich.

Application April 4, 1950, Serial No. 153,913

1 Claim. (Cl. 155—174)

This invention relates to attachments or devices used in motor vehicles particularly of the pleasure car type, and in particular a U-shaped bracket having an upwardly extended section with rearwardly extended cross bars wherein with the bracket positioned over the back of a seat a cushion for providing a head rest may be positioned in the cross bars.

The purpose of this invention is to provide means for suspending a cushion above the back of the seat of a motor vehicle to provide a head rest particularly adapted for drive-in theatres or for resting in a motor vehicle.

Various attempts have been made to position cushions against the sides of a vehicle to provide a head rest particularly used in drive-in theatres and in over-night driving but as the back of the seat does not extend upwardly a sufficient distance to receive the back of the head it is difficult to rest comfortably. With this thought in mind this invention contemplates a cushion holder slipped over the back of the seat whereby a cushion is supported above the upper edge of the back of the seat.

The object of this invention is, therefore, to provide an attachment for motor vehicles whereby a cushion may be supported above the upper edge of the back of a seat to provide a head rest.

Another object of the invention is to provide a head rest support for motor vehicle seats that may be supported on the seat without bolts, screws or other fastening means and that may readily be removed when not in use.

A further object of the invention is to provide a cushion supporting bracket for the back of a motor vehicle seat which supports the cushion above the upper edge of the seat back to provide a head rest, which is of a simple and economical construction.

With these and other objects and advantages in view the invention embodies a wire frame having an upper rearwardly extended section for holding a cushion and arcuate arms extended downwardly therefrom and positioned to nest over the upper edge of the back of a seat.

Other features and advantages of the invention will appear from the following description taken in connection with the drawings wherein.

Figure 1:
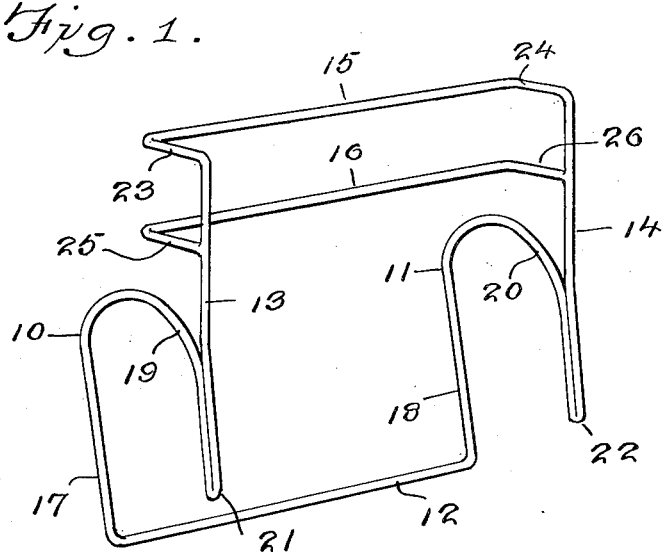
Figure 1 is a view illustrating the construction of the head rest cushion frame.

Referring now to the drawings wherein like reference characters denote corresponding parts the head rest bracket or frame of this invention includes a bracket formed with a pair of inverted U-shaped end members 10 and 11 with the lower ends of one of the arms thereof connected by a cross bar 12 and with the end of the other arms thereof bent over and extended upwardly forming posts 13 and 14, and with the upper ends of the posts connected by cross bars 15 and 16.

Figure 2:
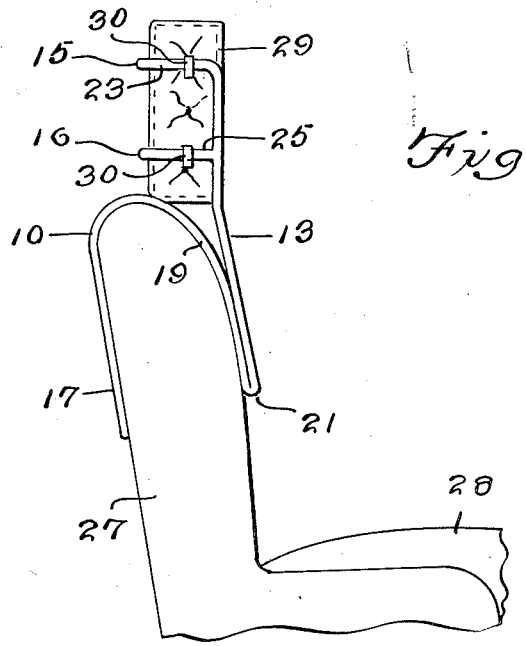
Figure 2 is an end elevational view showing the frame with a cushion therein and with the frame and cushion positioned on the upper edge of the back of a seat.

The end members 10 and 11 of the bracket are preferably shaped as illustrated in Figures 1 and 2 of the drawings with rear legs 17 and 18 extended straight downwardly to correspond with the rear surface of the back of a seat and with the forward legs 19 and 20, respectively having arcuate upper sections to correspond with the upper front surface of the back of a seat. The lower ends of the sections 19 and 20 bend over and fold upwardly at the points 21 and 22 providing the posts 13 and 14, respectively.

The material at the upper end of the post 13 extends rearwardly forming a section 23, the end of which is bent to form the cross bar 15 and a similar section 24 connects the upper end of the post 14 with the cross bar 15. The cross bar 16 is provided with end sections 25 and 26 that extend rearwardly connecting the ends of the bar 16 to the posts 13 and 14, respectively.

With the parts formed in this manner the bracket may readily be positioned over a back 27 of a seat 28 and a cushion 29 may be positioned in the upper end, being held between the rearwardly extended end sections 23, 24, 25 and 26 and against the cross bars 15 and 16.

The cushion may be fastened to the frame by clips 30 as shown in Figure 2 that may be fastened over the end sections of the cross bar.

By this means the cushion may readily be positioned above the upper edge of the back of a seat to provide a head rest when desired and the bracket may be moved along the back of the seat to any suitable position or may be removed without disconnecting fasteners or other devices.

It will be understood that modifications may be made in the design and arrangement of the parts without departing from the spirit of the invention.

What is claimed is:

In a motor vehicle seat head rest formed of a single strand of wire, the combination which comprises a bracket having inverted U-shape end members with downwardly extended front and rear arms, with the lower ends of the rear arms connected by a cross bar, with the arms at the front extended upwardly providing posts, and with the upper ends of the posts connected by rearwardly extended U-shaped cross bars.

LEON D. STRATTON.

REFERENCES CITED

The following references are of record in the file of this patent:

UNITED STATES PATENTS

| Number | Name | Date |
|---|---|---|
| 319,980 | Koenig | June 16, 1885 |
| 471,049 | Barth | Mar. 15, 1892 |
| 1,565,730 | Gilmour | Dec. 15, 1925 |
| 2,001,396 | Pumphrey | May 14, 1935 |
| 2,056,479 | Newman | Oct. 6, 1936 |